US007930252B2

(12) United States Patent
Bender et al.

(10) Patent No.: US 7,930,252 B2
(45) Date of Patent: Apr. 19, 2011

(54) METHOD AND SYSTEM FOR SHARING ANONYMOUS USER INFORMATION

(75) Inventors: Brad H. Bender, Brooklyn, NY (US); Garrett J. Cronin, White Plains, NY (US); John A. Lloyd, Louisville, CO (US)

(73) Assignee: Google, Inc., Mountain View, CA (US)

( * ) Notice: Subject to any disclaimer, the term of this patent is extended or adjusted under 35 U.S.C. 154(b) by 1307 days.

(21) Appl. No.: 09/983,493

(22) Filed: Oct. 24, 2001

(65) Prior Publication Data
US 2002/0099824 A1 Jul. 25, 2002

Related U.S. Application Data

(60) Provisional application No. 60/242,687, filed on Oct. 24, 2000.

(51) Int. Cl.
*G06Q 99/00* (2006.01)
(52) U.S. Cl. .............. 705/74; 705/50; 705/51; 705/52; 705/53; 705/64; 707/104.1; 709/228
(58) Field of Classification Search ............. 705/50-79; 809/219; 707/104.1; 709/228
See application file for complete search history.

(56) References Cited

U.S. PATENT DOCUMENTS

| 5,754,938 | A | * | 5/1998 | Herz et al. ................... 725/116 |
| 5,884,272 | A | | 3/1999 | Walker et al. |
| 5,961,593 | A | * | 10/1999 | Gabber et al. ............... 709/219 |
| 6,128,663 | A | * | 10/2000 | Thomas ...................... 709/228 |
| 6,144,988 | A | | 11/2000 | Kappel ....................... 709/202 |
| 6,230,188 | B1 | | 5/2001 | Marcus ....................... 709/206 |
| 6,292,904 | B1 | | 9/2001 | Broomhall et al. ............ 714/1 |
| 7,213,032 | B2 | * | 5/2007 | Mascarenhas ............ 707/104.1 |
| 2001/0029496 | A1 | * | 10/2001 | Otto et al. ..................... 705/74 |
| 2002/0055912 | A1 | * | 5/2002 | Buck ............................ 705/76 |

OTHER PUBLICATIONS

Lawton, George, "Is Technology Meeting the Privacy Challenge?", Computer, Sep. 2001, pp. 16-18.

* cited by examiner

Primary Examiner — Jalatee Worjloh
(74) *Attorney, Agent, or Firm* — Fish & Richardson P.C.

(57) ABSTRACT

A method and system for sharing online user information in an anonymous manner. The system associates an identifier with anonymized information of the user, and sends the anonymized user information to a receiving party.

In one embodiment, the system receives a temporary id with personally identifiable information from a Web site, uses the personally identifiable information as a key to obtain the anonymized information from a data source, and sends the temporary id with the anonymized information to the receiving party. The receiving party uses the temporary id, previously received by the Web site, as a key to obtain the anonymized information of the user.

In another embodiment, the system receives a temporary id from a Web site with a cookie from the user, uses the cookie as a key to obtain the anonymized information from a data source, and sends the temporary id with the anonymized information to the receiving party. The receiving party uses the temporary id, previously received by the Web site, as a key to obtain the anonymized information of the user.

23 Claims, 10 Drawing Sheets

METHOD AND SYSTEM FOR SHARING ANONYMOUS USER INFORMATION

CROSS REFERENCE TO RELATED APPLICATIONS

This application claims the benefit under 35 U.S.C. §119(e) of U.S. Provisional Application No. 60/242,687, filed Oct. 24, 2000.

TECHNICAL FIELD

The invention relates to sharing online user information in an anonymous manner.

BACKGROUND OF THE INVENTION

Consumers have recently become concerned about the manner in which online advertisers share data about users. One current way in which online advertisers can share user data is through cookie matching. A cookie is a piece of text generated and stored by a Web browser on behalf of a Web server. Each time the browser makes an HTTP request from the server, the cookie is sent back to the server. In this manner it becomes possible for a Web server to present customized pages to a given Web browser.

Cookie matching occurs when Web server (e.g., a merchant Web site) has the ability to read a cookie previously placed by another Web server (e.g., an online advertiser). For example, assume a fictitious Web site Electronics.com (which, for the purposes of this specification, may represent an online advertiser that promotes electronic goods) has an affiliate relationship with fictitious Web site DigitalCamera.com (which, for the purposes of this specification, may represent a merchant Web site that deals in digital cameras). DigitalCamera.com maintains a revolving product image on the Electronics.com homepage. When a given Electronics.com user clicks on the DigitalCamera.com product image, the associated Electronics.com cookie id could be passed to DigitalCamera.com. This would enable DigitalCamera.com to credit Electronics.com for the customer referral without Electronics.com needing to know the personally identifiable information ("PII") of the customer that it 'passed through' to DigitalCamera.com.

At this point, DigitalCamera.com has identifiers for both its own proprietary cookie and Electronics.com's cookie. If, in a separate database transfer, Electronics.com sends DigitalCamera.com its online information about the user (e.g., that the user is actively interested in TVs and VCRs), referenced only by Electronics.com's cookie id (and not by PII about the user, such as name and address), DigitalCamera.com is then able to match the identifiers and build an information profile on that user. However, if the Web sites cannot be trusted, it would be possible to send the PII from DigitalCamera.com back to Electronics.com, and make the previously anonymous web activity personally identifiable.

Accordingly, there is a need in the art for a system and method that would allow, for example, an online advertiser to access anonymous user information in order to provide marketing services to the user (e.g., targeted banner advertising on Web sites), but would not allow the advertiser to triangulate the user's PII with other information sources in an attempt to personally identify the user.

SUMMARY OF THE INVENTION

The present invention is directed to a method and system for anonymously sharing information relating to a user. The invention associates an identifier with "anonymized" information of the user, and sends the anonymized user information to a receiving party ("RP"). In one embodiment of the invention, the system may collect user data from any data source (whether online or offline) and anonymize the data before delivering it to a third party (e.g., a receiving party). In another embodiment, the user data from the data source may already be anonymized. This user information (e.g., transactional, demographic, and/or behavioral) may be delivered to a receiving party without being linked or coupled to PII about the user. Additionally, the information collection process is a unidirectional process as the anonymized data may not be used or collated in any matter to determine (e.g., triangulate) the PII information.

The method and system of the present invention may allow a receiving party to collect both user demographic and transactional data, for example, while still protecting the anonymity of users (e.g., consumers). This data collection technique enables the receiving party to employ a deeper data set to heighten the predictive potential of its database—as well as create new, and enhance existing, product offerings. In this exemplary system, no single party holds enough of the data pieces to determine (e.g., via reverse engineering using a receiving party cookie) the personally identifiable information of an actual user.

Further advantages of the present invention may include the following: 1) advertisers may be served by having a deeper data set to target against; 2) publishers may benefit by receiving increased ad rates for their more highly targeted inventory while maintaining online user/consumer privacy; 3) merchants may benefit by having additional data in a data table maintained by the receiving party which enhances product and service solutions for the merchant that are delivered by the receiving party. Additionally, advertisers may use the data collected to create products that will intelligently target advertisements to users by utilizing anonymous online behavioral and intent data. This application may also include anonymously coupling of demographic and transactional data with pre-existing behavioral and intent data to provide a robust data set by which to predict future online behavior, and it also simultaneously protects the anonymity of an advertiser's consumer base. Anonymity of the users may be achieved by grouping like users into clusters, or buckets, along with thousands of other like users.

DETAILED DESCRIPTION

Figure 1:
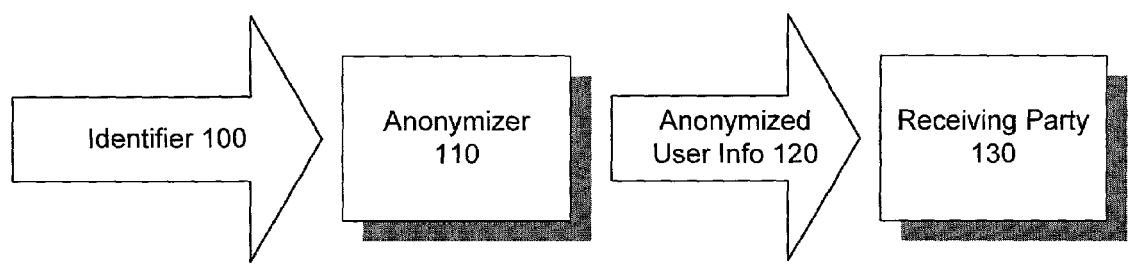
FIG. 1 is a block diagram that depicts sharing online user information in an anonymous manner in accordance with an embodiment of the present invention.
Figure 2:
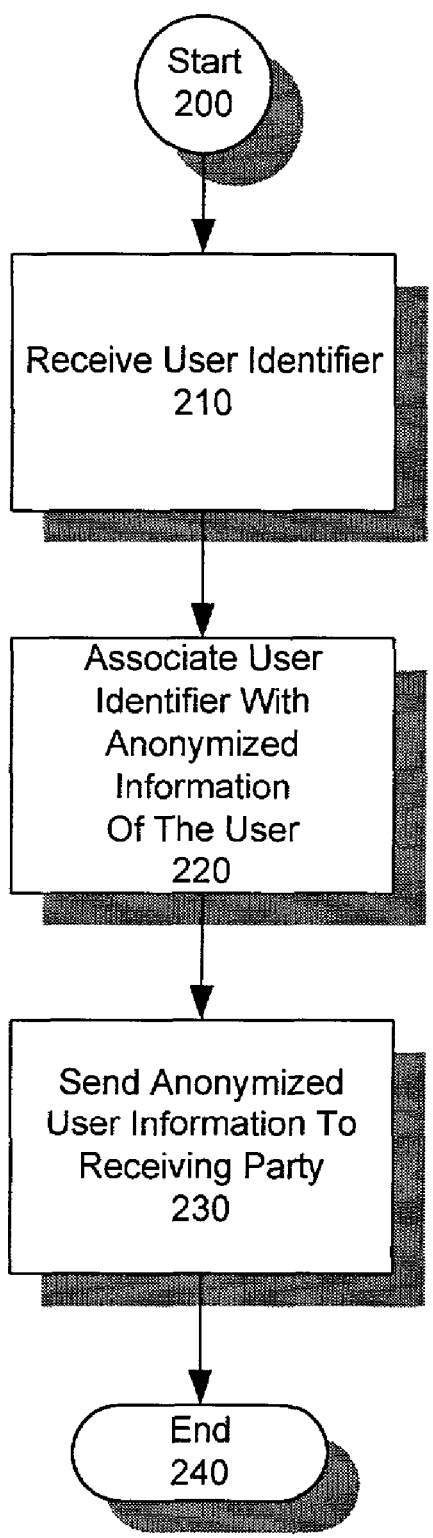
FIG. 2 is flow chart that illustrates a process for sharing online user information in an anonymous manner in accordance with an embodiment of the present invention.

FIG. 1 provides an exemplary overview of the present invention, with FIG. 2 illustrating the accompanying process. Anonymizer 110 receives identifier 100 as input (step 210). Identifier 100 may include a user identifier (e.g., PII), a Web browser identifier (e.g., a cookie), or any other identifier. The PII information may include a user's name, address, telephone number, social security number, email address, or other information that may personally identify the user. The cookie is a piece of text that enables a given Web server to identify a given Web browser on subsequent requests to the server (e.g. visits to a Web site and/or page).

Anonymizer 110 associates identifier 100 with anonymized information of the user (step 220). Non-anonymized user information may include transactional ("trans"), demographic ("demo"), and behavioral information and may be used by advertisers, publishers, and merchants for various applications. An advertiser may refer to any entity that promotes or sells products, services, information, or other items. A publisher may refer to any entity hosting, owning, or controlling a site (e.g., online/Internet Web site) accessible to a user of a communications network. A merchant may refer to any entity that accepts, collects, or transfers user registration information, a common example being the in the course of selling or promoting a product, service, or information to a user.

Anonymized information refers to anonymous user information or non-Pll that cannot be used to uniquely identify a particular user. To "anonymize" personal user information, user information may be "bucketed" to make it non-personal where unique personal information (e.g., state of residence) is broadened or expanded into a more general category (e.g., geographic region of country).

Once anonymizer 110 has associated identifier 100 with anonymized information of the user, anonymizer 110 sends the anonymized user information to receiving party 130. Uses of the collected anonymized data by receiving party 130 may include profile delivery, advertisement delivery, data reporting, and other uses.

Figure 3:
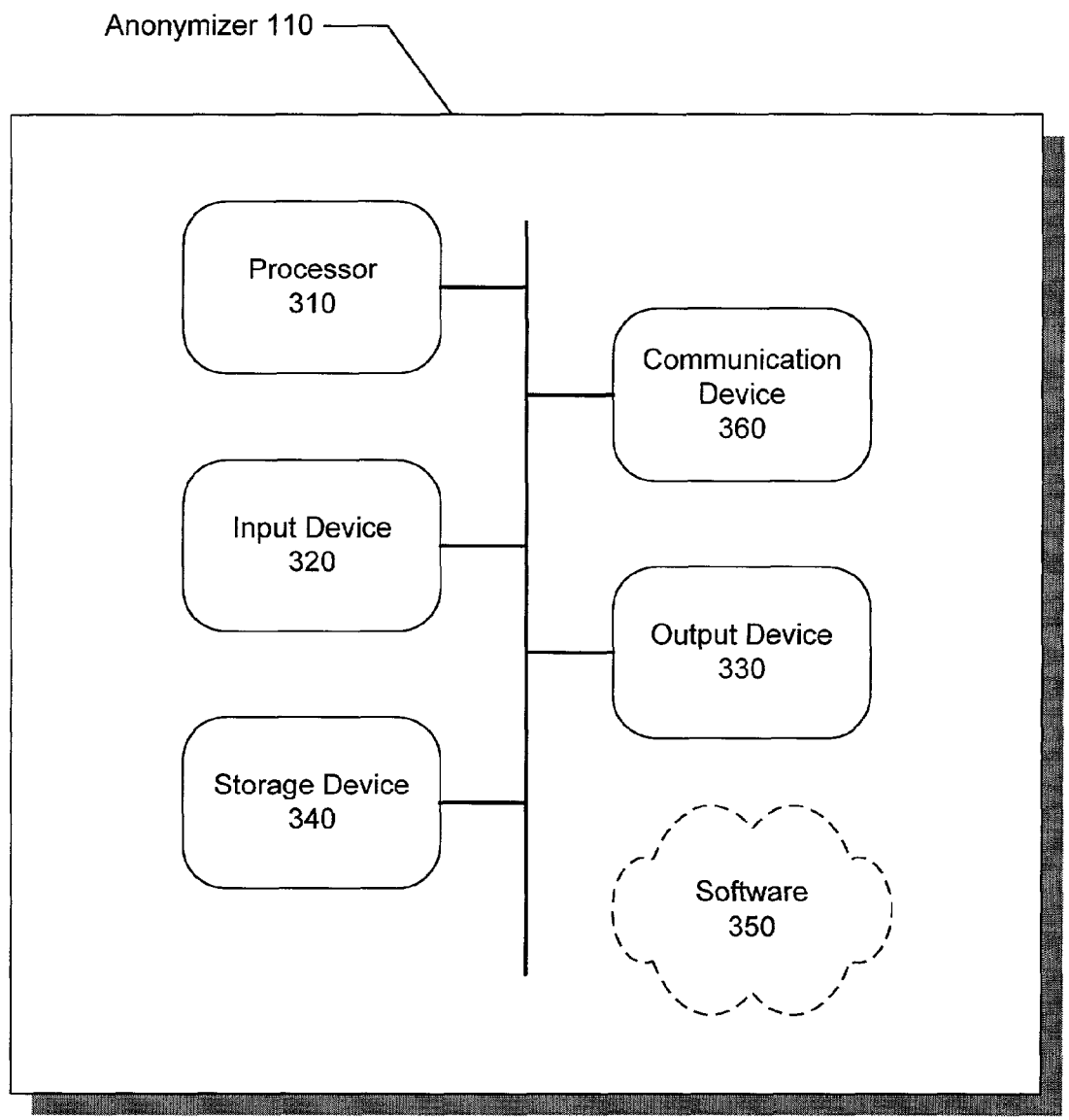
FIG. 3 is a block diagram that depicts an anonymizer in accordance with an embodiment of the present invention.

FIG. 3 depicts an anonymizer in accordance with an embodiment of the present invention. Anonymizer 110 may be a Web server, personal computer or any other type of microprocessor-based device. Anonymizer 110 may include a processor 310, input device 320, output device 330, storage device 340, software 350, and communication device 360. Input device 320 may include a keyboard, mouse, pen-operated touch screen, voice-recognition device, or any other device that provides input from a user. Output device 330 may include a monitor, printer, disk drive, speakers, or any other device that provides tangible output to user.

Storage device 340 may include volatile and nonvolatile data storage. Volatile data storage includes RAM, a cache, or any storage medium that temporarily holds data while being processed; nonvolatile data storage includes a hard drive, CD-ROM drive, tape drive, removable storage disk, or any other non-temporary storage medium. Communication device 360 may include a modem, network interface card, or any other device capable of transmitting and receiving signals over a network.

Software 350 may be executed by processor 310 and may include an "anonymization engine," which receives identifier 100 via input from input device 320, associates identifier 100 with anonymized information of the user, and sends the anonymized user information to receiving party 130 via output device 330.

Figure 4:
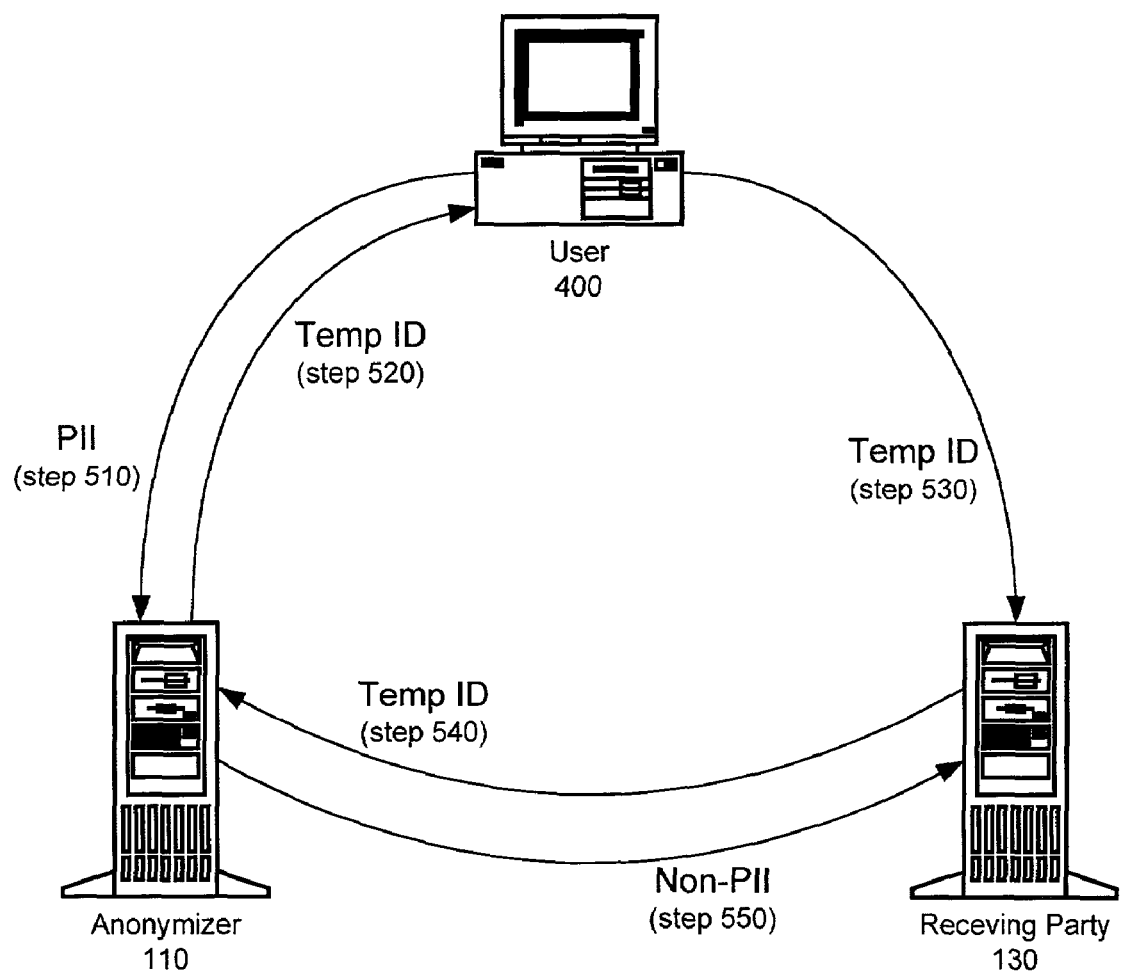
FIG. 4 is a block diagram that depicts sharing online user information in an anonymous manner in accordance with an embodiment of the present invention.
Figure 5:
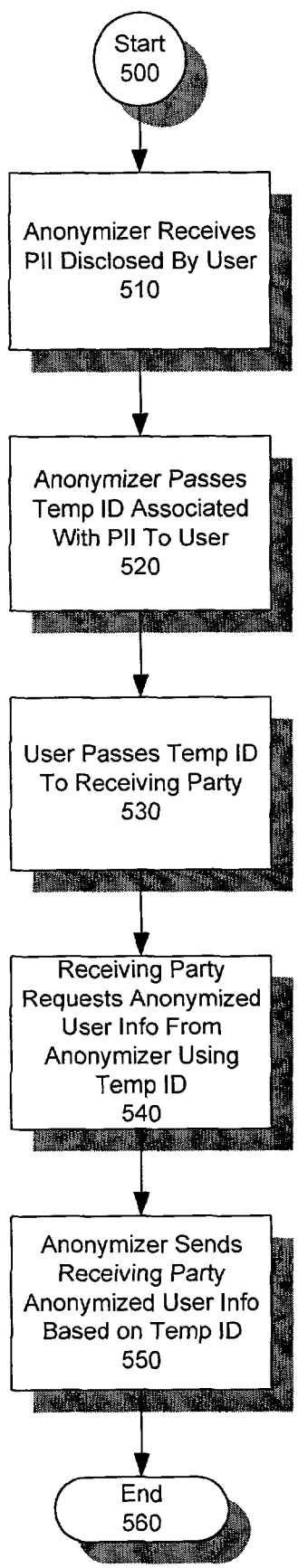
FIG. 5 is flow chart that illustrates a process for sharing online user information in an anonymous manner in accordance with an embodiment of the present invention.

FIG. 4 depicts sharing online user information in an anonymous manner in accordance with an embodiment of the present invention, with FIG. 5 illustrating the accompanying process. In FIG. 4, receiving party 130 obtains anonymized user information 120 from anonymizer 110, which has a non-anonymous relationship with user 400.

Anonymizer 110 receives PIT disclosed by user 400 (step 510). Anonymizer 110 associates this PIT information with a temporary identifier and passes the temporary identifier to user 400 (step 520). During the course of exemplary communications (e.g., Web browsing on the Internet), user 400 may interact anonymously with receiving party 130 and pass the temporary identifier to receiving party 130 during the course of the interactive communications (step 530).

Receiving party 130, having an anonymous relationship with user 400, may request non-PII anonymized user information 120 from anonymizer 110 using the temporary identifier (step 540). In response to this request, anonymizer 110 sends anonymized user information 120 to receiving party 130 based on the temporary identifier (step 550) and then deletes the temporary identifier associated with user 400.

As a result of this process, receiving party 130 is able to collect the anonymized user information using the temporary identifier, but receiving party 130 (or any other party) is prevented from ascertaining or requesting associated PI of user 400 from anonymizer 110 based on the temporary identifier since the temporary identifier has been deleted by anonymizer 110. Even if the temporary identifier had not been deleted, user 400's PII could still not be ascertained since it has been anonymized. Another useful result of this process is that user 400 is efficiently utilized as a transparent intermediary (independent of any user selection) for facilitating transfer of anonymized user information to receiving party 130.

Merchant Embodiment

Figure 6:
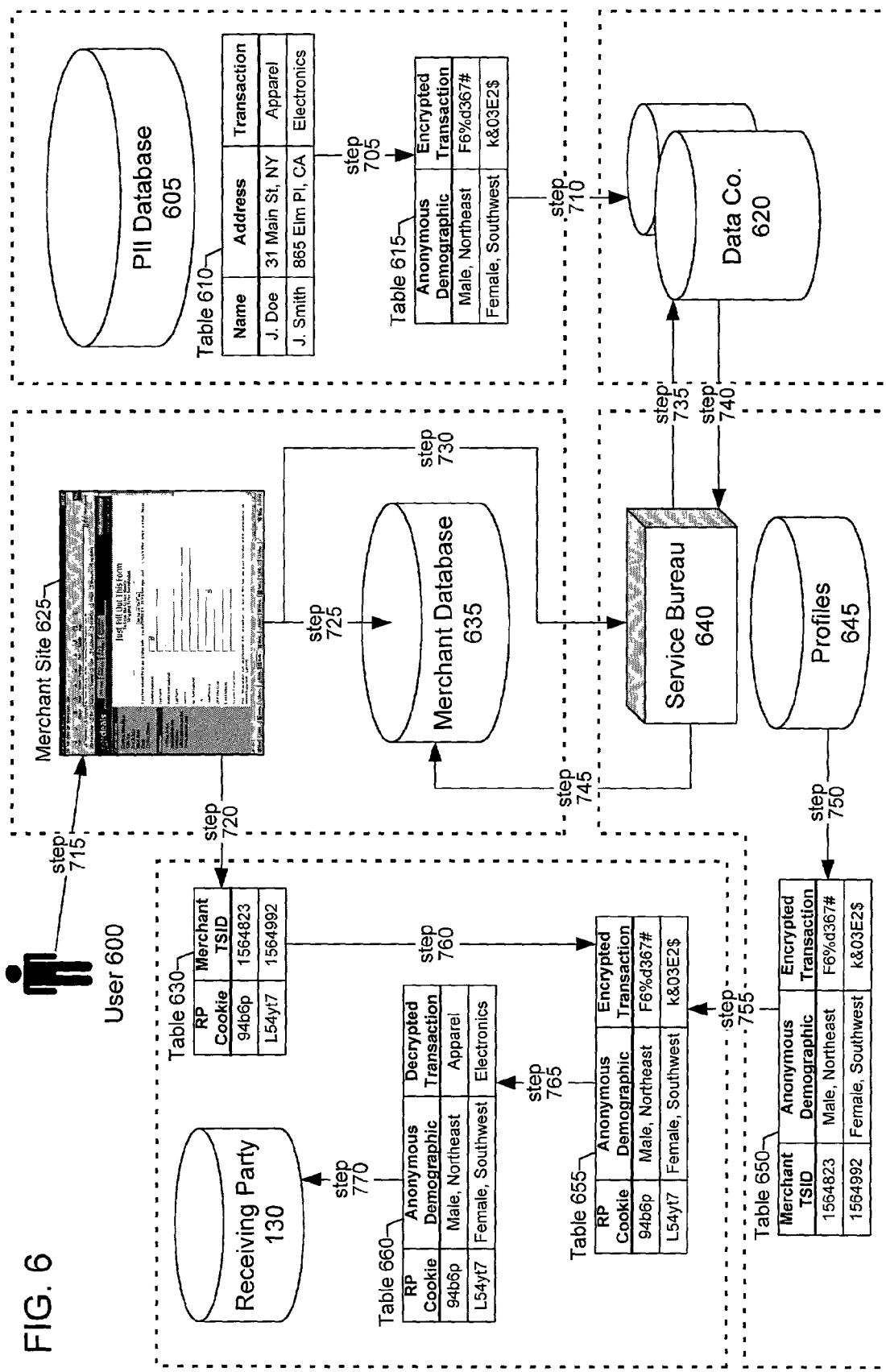
FIG. 6 is a block diagram that depicts anonymously sharing online user information though a merchant site in accordance with an embodiment of the present invention.
Figure 7:
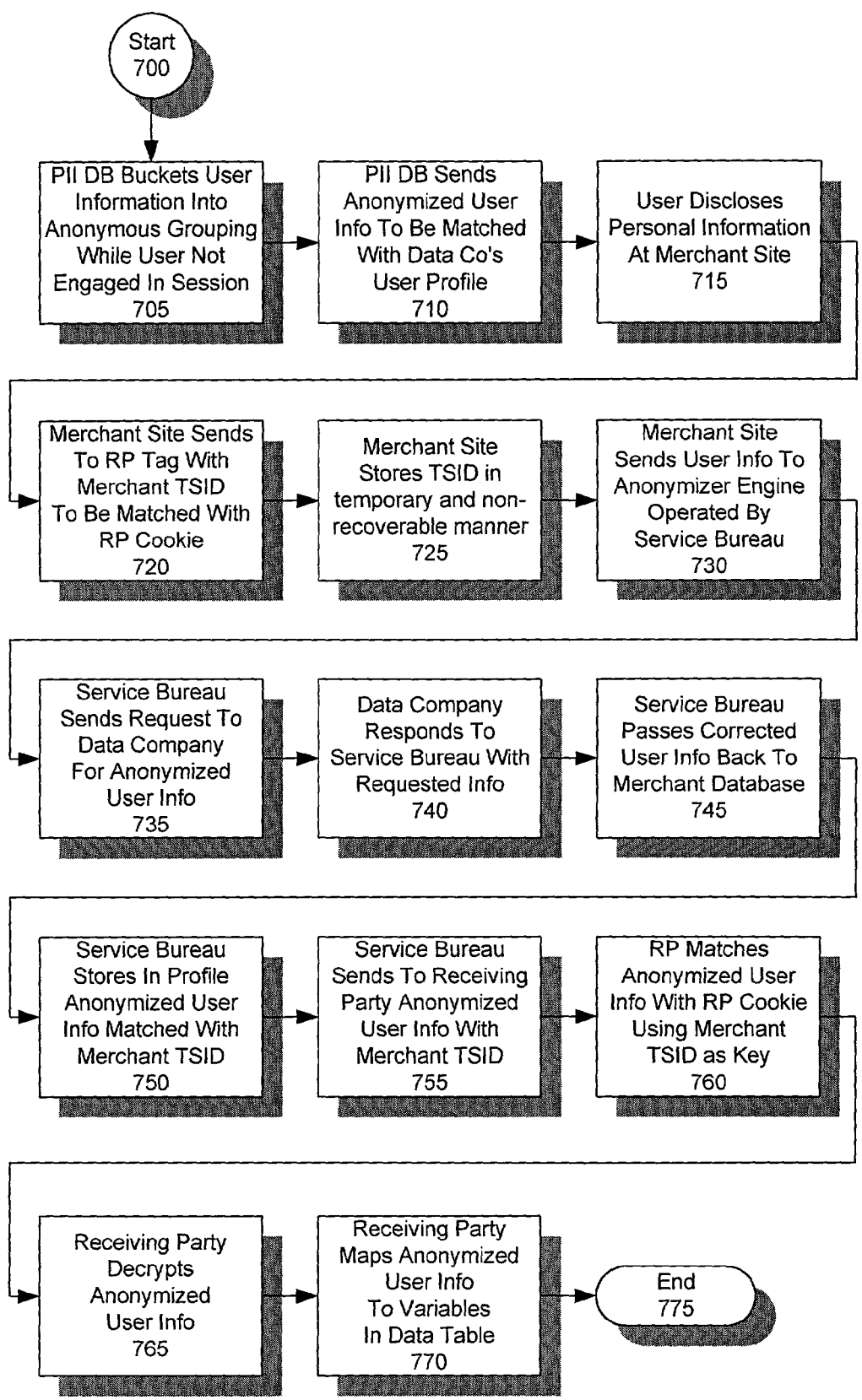
FIG. 7 is flow chart that illustrates a process for sharing online user information though a merchant site in accordance with an embodiment of the present invention.

FIG. 6 is a block diagram of the anonymous collection process for an exemplary embodiment featuring a provider of goods and/or services over an interactive communications network (e.g., an online merchant on the Internet), with FIG. 7 illustrating the accompanying process. To enhance data security and privacy in the communications environment, one may employ secure connections for all point-to-point communications within the system. These may include connections between PII database 605 and data company 620, between data company 620 and service bureau 640 (which acts as anonymizer 110 in this embodiment, operating the anonymizer engine), and between service bureau 640 and receiving party 130. These secure connections may be implemented using a Secure Socket Layer (SSL) connection. The dotted line borders in the figures do not necessarily reflect an entity division (such as different domains), but a division of system duties which would enable the maximum levels of scaleability for the system.

PII database 605 may include user information. Examples of PII databases would be those used by companies that maintain customer information alongside of purchase history. This user information may include personal user information (e.g., name, address, phone number, etc.) along with transactional, demographic, behavioral, and/or other information coupled to the user name and address. For the exemplary process described herein, transactional and demographic data are used as the exemplary data that may be coupled to a user's personal information, and a user's name and address is used as the exemplary personal user information contained in PII database 605. It is noted that the use of transactional and demographic data and a user's name and address is strictly exemplary (see table 610 in FIG. 6) and other forms of data and other personal information may be used in connection with the present inventive method and system.

Step 705 is performed by a provider of PII database 605, and may be performed independent of user 600's engagement in an active session with merchant site 625 (e.g., offline). At step 705, this user information is bucketed, or clustered, into an anonymous grouping to prevent triangulation, and the transactional data is encrypted to ensure that other parties are unable to access the data. For example, the user information may include demographic information identifying user 600 as an Australian with two children living in New York. During the bucketing process, this demographic information may be anonymized as a foreigner with more than one child living in the Northeast section of the United States. Furthermore, the transactional data may similarly be bucketed prior its encryption. Thus, for example, a transaction showing a purchase of a J. Crew men's sweater on Jul. 1, 2000 for $49 may be bucketed as a purchase of a men's apparel item during the 3rd Quarter, 2000 for an amount less than $100. As a result of this process, a party with access to the anonymized user information cannot determine, or triangulate, a unique individual from this data as any sensitive data has been removed, ensuring quality control for the system. An exemplary output from step 705 would be an output file including the following:

<Name><Address><Anon Demo><Encrypted Trans>

This exemplary code provides the name, address, anonymized demographic information, and encrypted transactional data string for user 600 (see table 615 in FIG. 6).

The parts of step 710 are performed by the provider of PII database 605 and data company 620, and may be performed independent of user 600's engagement in an active session with merchant site 625 (e.g., offline). At step 710, the provider of PII database 605 sends the user information including the name, address, anonymized demographic information, and encrypted transactional data to data company 620. One may use a secure connection for this communication between PII database 605 and data company 620. Data company 620 may already have stored the name, address, and demographic information for user 600 in its database. Upon receiving the name, address, anonymized demographic information, and encrypted transaction data, data company 620 matches the received name and address to the user name and address already stored and appends the encrypted transaction data and the anonymized demographic information to the stored user name and address. Additionally during this step, data company 620 could optionally validate the name and address information received from PII database 605.

Step 715 may be performed by user 600 at merchant site 625. At step 715, user 600 may commence an active session by visiting (via a browser) online merchant site 625 and disclosing personal information, via an online registration form, login process, or any other request for personal information process, to merchant site 625. For this example, the personal information includes the user name and address. Merchant site 625 discloses to user 600 its privacy policy including that user name and address information may be passed to a data company for the process of address verification and profile development. Additionally, merchant site 625 may enable user 600 to opt-out from receiving any targeted information (e.g., banner advertising) as a result of user 600's disclosure. The opting-out may be performed, for example, by using a point-and-click application (e.g., link to receiving party 130).

Step 720 is performed by merchant site 625. For this example, after user 600 registers online, merchant site 625 may create an HTML tag and dynamically generate a temporary session id ("TSID"), associated with user 600, which is sent over to receiving party 130's server as a request for a 1×1 pixel. The request for the 1×1 pixel is an image request from merchant site 625. The image request allows receiving party 130 to deliver an image to merchant site 625 and collect information from merchant site 625, such as the TSID, and a receiving party cookie if found from user 600's browser. The TSID is used by receiving party 130 to create table 630 matching the TSID to the receiving party cookie (a data identifier).

Receiving party 130 takes the tag sent by merchant site 625, an exemplary tag including the following:

<img src="http://www.receivingparty.net/pixel; tempID=[TSID]?> and creates a table out of it which looks like this:

<Receiving Party Cookie><Merchant TSID>

An exemplary "Merchant TSID" may simply be a unique 6-digit source id for merchant site 625 appended to the unique TSID. The TSID may last as long as user 600 remains at merchant site 625, after which time it may expire. Moreover, the TSID could optionally be set to expire automatically after a period of time (either predetermined or calculated from other factors). In an alternative embodiment, the TSID could be generated at the browser level through a Web server call, utilizing javascript or any other client-side code.

Steps 725-750 may be performed consecutively in real-time.

At step 725, one may limit the time for which data (e.g., user 600's TSID) may be retained. At merchant site 625, for example, user 600's TSID may be stored as a session variable in RAM only on merchant site 625's Web server, and may be temporary and non-recoverable, with such storage lasting only as long as the TSID remains active. Upon expiration of the TSID, the TSID may be removed from temporary storage. Additionally, as a further exemplary security measure, it may be enforced as a data processing rule that the association between TSID and Name and Address is never written to disk.

For step 730, merchant site 625 feeds the name and address information (which serves as identifier 100) in merchant customer database 635 to an anonymizer engine operated by service bureau 640 to verify or validate the name and address information input by user 600. Merchant site 625 would, for example, pass:

<Merchant TSID><Name><Address> via an encrypted re-direct (SSL, a secure socket layer) to service bureau 640.

At this point merchant site 625 now continues with its interaction with user 600 for the rest of the session—after which point the RAM TSID is destroyed. Also, the TSID may be destroyed in response to other indicating factors including, but not limited to a timer. Additionally, for new user registrations, merchant site 625 may optionally store user 600's inputted information to merchant database 635 (e.g., name, address, and transactional data).

At step 735, upon receiving the validation request from merchant site 625 (step 730), service bureau 640, operator of the anonymizer engine, sends a request over to data company 620 for information corresponding to the user name and address.

At step 740, data company 620 replies to the validation request received from service bureau 640. Data company 620 verifies the name and address information received and passes back the corrected address details, anonymized demographic data, and encrypted transactional data corresponding to user 600 to service bureau 640. An exemplary feed from data company 620 may include the following:

<Name><Address><Anon Demo><Encrypted Trans>

Any corrections may be fed back to the merchant site (see step 745). One may employ secure connections for communication between data company 620 and service bureau 640, operator of the anonymizer engine. Possible exemplary scenarios include these cases:

Case One:
The name and address sent across by service bureau 640 is found in the database and it is correct.
The original name and address, the message "Correct Address," anonymized demographic data and encrypted transactional data on user 600 is sent back to service bureau 640.

Case Two:
The name and address sent across by service bureau 640 is not found in the database.
Both the original name and address for user 600 and the message "Not found" are returned to service bureau 640.

Case Three:
The name and address is found and is incorrect by the standards of data company 620.
The original name and address, the corrected name and address, anonymized demographic data and encrypted transactional data for user 600 are returned to service bureau 640.

At optional step 745, which may be performed on a periodic schedule, the anonymizer engine run by service bureau 640 would pass back the corrected name and address to merchant site 625. For example, only changes/corrections would be passed back to merchant site 625 and would be performed at an encrypted file and/or message level. Additionally, data company 620 may optionally pass back other user information. The following shows the exemplary scenarios and resulting messages that may occur:

Case One:
The name and address sent across by service bureau 640 is found in data company 620's database and it is correct.
No message is generated back to merchant site 625.

Case Two:
The name and address sent across by service bureau 640 is not found in data company 620's database.
Both the original name and address and the message "Not found" are returned to merchant site 625.

Case Three:
The name and address is found and is incorrect.
The original name and address and the corrected name and address are returned to merchant site 625.

At step 750, merchant site 625's TSID, anonymized demographic information, and encrypted transactional data from data company 620 are stored in a transactional profile database 645 by service bureau 640. The profile would look like this (see table 650 in FIG. 6):

<Merchant TSID><Anonymous Demo><Encrypted Trans>

One may limit the time for which this data is retained, for example, by maintaining this data for a maximum of 36 hours. The name and address information are removed from profiles database 645. The database may contain a table of multiple transactional profiles.

At step 755, service bureau 640 sends out the merchant TSID, anonymized demographic information and the encrypted transactional data to receiving party 130. The data sets outlined in step 750 may be sent to receiving party 130 via a SCP server (secure copy) and are never written to disk. Additionally, service bureau 640 deletes the transactional profile (table 650 in FIG. 6) containing the user information (TSID, anonymized demographic information, and encrypted transaction string).

At step 760, using earlier created table 630 matching the receiving party cookie with the TSID, receiving party 130 matches the anonymized demographic information and the encrypted transactional data of received table 650 with the receiving party cookie associated with user 600 in table 630 by using the merchant TSID as a key. The merchant TSID is then deleted from the system. The new, exemplary record created by this action may include the following (see table 655 in FIG. 6):

<Receiving Party cookie><Anon Demo><Encrypted Trans>

One may limit the time for which this data is retained, for example, by maintaining this data for a maximum of 36 hours.

At step 765, receiving party 130 may decrypt the transactional data to yield (see table 660 in FIG. 6):

<Receiving Party cookie><Anony Demo><Decrypted Trans>

One may limit the time for which this data is retained, for example, by maintaining this data for a maximum of 36 hours.

At step 770, receiving party 130 transfers the received user data to a data storage area. The non-unique demographic and rolled-up transactional data may be mapped to variables in a data table, for example, a Behavioral Attribute Table ("BAT"). The anonymized demographic and transactional data is then added to the BAT.

In accordance with this embodiment, Table 1 illustrates the type of data accessible by each entity during the associated steps described in the merchant embodiment.

TABLE 1

| Entity | Step(s) | PII | Trans | Demo | TSID | RP Cookie |
|---|---|---|---|---|---|---|
| PII Database 605 | 705, 710 | X | X | | | |
| Data Company 620 | 710, 735, 740 | X | [Encrypted] | X | | |
| Merchant Database 635 | 715-730, 745 | X | | | X | |
| Service Bureau 640 (Profiles 645) | 735, 740 | X | [Encrypted] | X | | |
| | 730, 745 | X | | | X | |
| | 750, 755 | | [Encrypted] | X | X | |
| Receiving Party 130 | 755 | | [Encrypted] | X | X | |
| | 720, 760 | | | | X | X |
| | 765, 770 | | X | X | | X |

Table 2 illustrates the data flow through PII database 605 for each step described above:

TABLE 2

| Step | | Name | PII Database Address | Transactions |
|---|---|---|---|---|
| 700 | START STATE | J. Doe | 31 Main St, NY | J. Crew Sweater, 7/2000, $50 |

TABLE 2-continued

| Step | | Name | PII Database Address | Transactions |
|---|---|---|---|---|
| 705 | Bucketing/De-triangulation | J. Doe | Northeast | Apparel, Q3 2000, <$100 |
| 705(a) | Encryption of Transaction Data | J. Doe | Northeast | F6%d367# |
| 710 | Table Sent To Data Co. | | | |
| 710 | Data Co. Appends Encrypted String | | | |
| 715 | User Visits Merchant Site | | | |
| 720 | Merchant Site Sends TSID To Receiving Pty | | | |
| 725 | User Registers on Site | | | |
| 730 | Merchant Site Routes User Registration Info To Service Bureau with TSID | | | |
| 735 | Service Bureau Sends Name and Address for Validation To Data Co. | | | |
| 740 | Data Co. Modifies Address As Required (in this case, from 13 Main to 31 Main), Appends Demo and Encrypted Trans Data, and Sends To Service Bureau | | | |
| 745 | Service Bureau Returns Validated Address to Merchant (Optional) | | | |
| 750 | Name and Address Are Dropped from Service Bureau | | | |
| 755 | Service Bureau Sends Table To Receiving Pty; Table Is Erased in Service Bureau | | | |
| 760 | Receiving Pty Exchanges DC Cookie for TSID | | | |
| 765 | Trans Are Decrypted; TSID Is Dropped | | | |
| 770 | Data Is Added To Receiving Pty's Data Repository | | | |
| 775 | END STATE | J. Doe | 31 Main St, NY | J. Crew Sweater, 7/2000, $50 |

Table 3 illustrates the data flow through data company 620 for each step described above:

TABLE 3

| Step | | Name | Merchant Address | Data Co. Address | Demo | Trans |
|---|---|---|---|---|---|---|
| 700 | START STATE | J. Doe | | 31 Main St, NY | Male | |
| 705 | Bucketing/De-triangulation | | | | | |
| 705(a) | Encryption of Transaction Data | | | | | |
| 710 | Table Sent to Data Co. | J. Doe | | 31 Main St, NY | | F6%d367# |
| 710 | Data Co. Appends Encrypted String | J. Doe | | 31 Main St, NY | Male | F6%d367# |
| 715 | User Visits Merchant Site | | | | | |
| 720 | Merchant Site Sends TSID To Receiving Pty | | | | | |
| 725 | User Registers on Site | | | | | |
| 730 | Merchant Site Routes User Registration Info To Service Bureau with TSID | | | | | |
| 735 | Service Bureau Sends Name and Address for Validation To Data Co. | J. Doe | 13 Main St, NY | 31 Main St, NY | Male | F6%d367# |
| 740 | Data Co. Modifies Address As Required (in this case, from 13 Main to 31 Main), Appends Demo and Encrypted Trans Data, and Sends To Service Bureau | | | | | |
| 745 | Service Bureau Returns Validated Address to Merchant (Optional) | | | | | |
| 750 | Name and Address Are Dropped from Service Bureau | | | | | |
| 755 | Service Bureau Sends Table To Receiving Pty; Table Is Erased in Service Bureau | | | | | |
| 760 | Receiving Pty Exchanges DC Cookie for TSID | | | | | |
| 765 | Trans Are Decrypted; TSID Is Dropped | | | | | |
| 770 | Data Is Added To Receiving Pty's Data Repository | | | | | |
| 775 | END STATE | J. Doe | | 31 Main St, NY | Male | F6%d367# |

Table 4 illustrates the data flow through merchant database 635 for each step described above:

TABLE 4

| Step | | Name | Merchant Address | Data Co. Address |
|---|---|---|---|---|
| 700 | START STATE | | | |
| 705 | Bucketing/De-triangulation | | | |
| 705(a) | Encryption of Transaction Data | | | |
| 710 | Table Sent To Data Co. | | | |
| 710 | Data Co. Appends Encrypted String | | | |
| 715 | User Visits Merchant Site | | | |
| 720 | Merchant Site Sends TSID To Receiving Pty | | | |
| 725 | User Registers on Site | J. Doe | 13 Main St, NY | |
| 730 | Merchant Site Routes User Registration Info To Service Bureau with TSID | | | |
| 735 | Service Bureau Sends Name and Address for Validation To Data Co. | | | |
| 740 | Data Co. Modifies Address As Required (in this case, from 13 Main to 31 Main), Appends Demo and Encrypted Trans Data, and Sends To Service Bureau | | | |
| 745 | Service Bureau Returns Validated Address to Merchant (Optional) | J. Doe | 13 Main St, NY | 31 Main St, NY |
| 750 | Name and Address Are Dropped from Service Bureau | | | |
| 755 | Service Bureau Sends Table To Receiving Pty; Table Is Erased in Service Bureau | | | |
| 760 | Receiving Pty Exchanges DC Cookie for TSID | | | |
| 765 | Trans Are Decrypted; TSID Is Dropped | | | |
| 770 | Data Is Added To Receiving Pty's Data Repository | | | |
| 775 | END STATE | J. Doe | 13 Main St, NY | 31 Main St, NY |

Table 5 illustrates the data flow through service bureau 640 for each step described above:

TABLE 5

| Step | | Name | Merchant Address | TSID | Data Co. Address | Demo | Trans |
|---|---|---|---|---|---|---|---|
| 700 | START STATE | | | | | | |
| 705 | Bucketing/De-triangulation | | | | | | |
| 705(a) | Encryption of Transaction Data | | | | | | |
| 710 | Table Sent To Data Co. | | | | | | |
| 710 | Data Co. Appends Encrypted String | | | | | | |
| 715 | User Visits Merchant Site | | | | | | |
| 720 | Merchant Site Sends TSID To Receiving Pty | | | | | | |
| 725 | User Registers on Site | | | | | | |
| 730 | Merchant Site Routes User Registration Info To Service Bureau with TSID | J. Doe | 13 Main St, NY | 1564823 | | | |
| 735 | Service Bureau Sends Name and Address for Validation To Data Co. | | | | | | |
| 740 | Data Co. Modifies Address As Required (in this case, from 13 Main to 31 Main), Appends Demo and Encrypted Trans Data, and Sends To Service Bureau | J. Doe | 13 Main St, NY | 1564823 | 31 Main St, NY | Male | F6%d367# |
| 745 | Service Bureau Returns Validated Address to Merchant (Optional) | | | 1564823 | | Male | F6%d367# |
| 750 | Name and Address Are Dropped from Service Bureau | | | | | | |
| 755 | Service Bureau Sends Table To Receiving Pty; Table Is Erased in Service Bureau | | | | | | |
| 760 | Receiving Pty Exchanges DC Cookie for TSID | | | | | | |
| 765 | Trans Are Decrypted; TSID Is Dropped | | | | | | |
| 770 | Data Is Added To Receiving Pty's Data Repository | | | | | | |
| 775 | END STATE | | | | | | |

Table 6 illustrates the data flow through receiving party 130 for each step described above:

TABLE 6

| Step | | Receiving Pty Cookie | TSID | Demo | Trans |
|---|---|---|---|---|---|
| 700 | START STATE | | | | |
| 705 | Bucketing/ De-triangulation | | | | |
| 705(a) | Encryption of Transaction Data | | | | |
| 710 | Table Sent To Data Co. | | | | |
| 710 | Data Co. Appends Encrypted String | | | | |
| 715 | User Visits Merchant Site | | | | |
| 720 | Merchant Site Sends TSID To Receiving Pty | 94b6p | 1564823 | | |
| 725 | User Registers on Site | | | | |
| 730 | Merchant Site Routes User Registration Info To Service Bureau with TSID | | | | |
| 735 | Service Bureau Sends Name and Address for Validation To Data Co. | | | | |
| 740 | Data Co. Modifies Address As Required (in this case, from 13 Main to 31 Main), Appends Demo and Encrypted Trans Data, and Sends To Service Bureau | | | | |
| 745 | Service Bureau Returns Validated Address to Merchant (Optional) | | | | |
| 750 | Name and Address Are Dropped from Service Bureau | | | | |
| 755 | Service Bureau Sends Table To Receiving Pty; Table Is Erased in Service Bureau | | 1564823 | Male | F6%d367# |
| 760 | Receiving Pty Exchanges DC Cookie for TSID | 94b6p | 1564823 | Male | F6%d367# |
| 765 | Trans Are Decrypted; TSID Is Dropped | 94b6p | | Male | Apparel, Q3 2000, <$100 |
| 770 | Data Is Added To Receiving Pty's Data Repository | 94b6p | | Male | Apparel, Q3 2000, <$100 |
| 775 | END STATE | 94b6p | | Male | Apparel, Q3 2000, <$100 |

Publisher Embodiment

Figure 8:
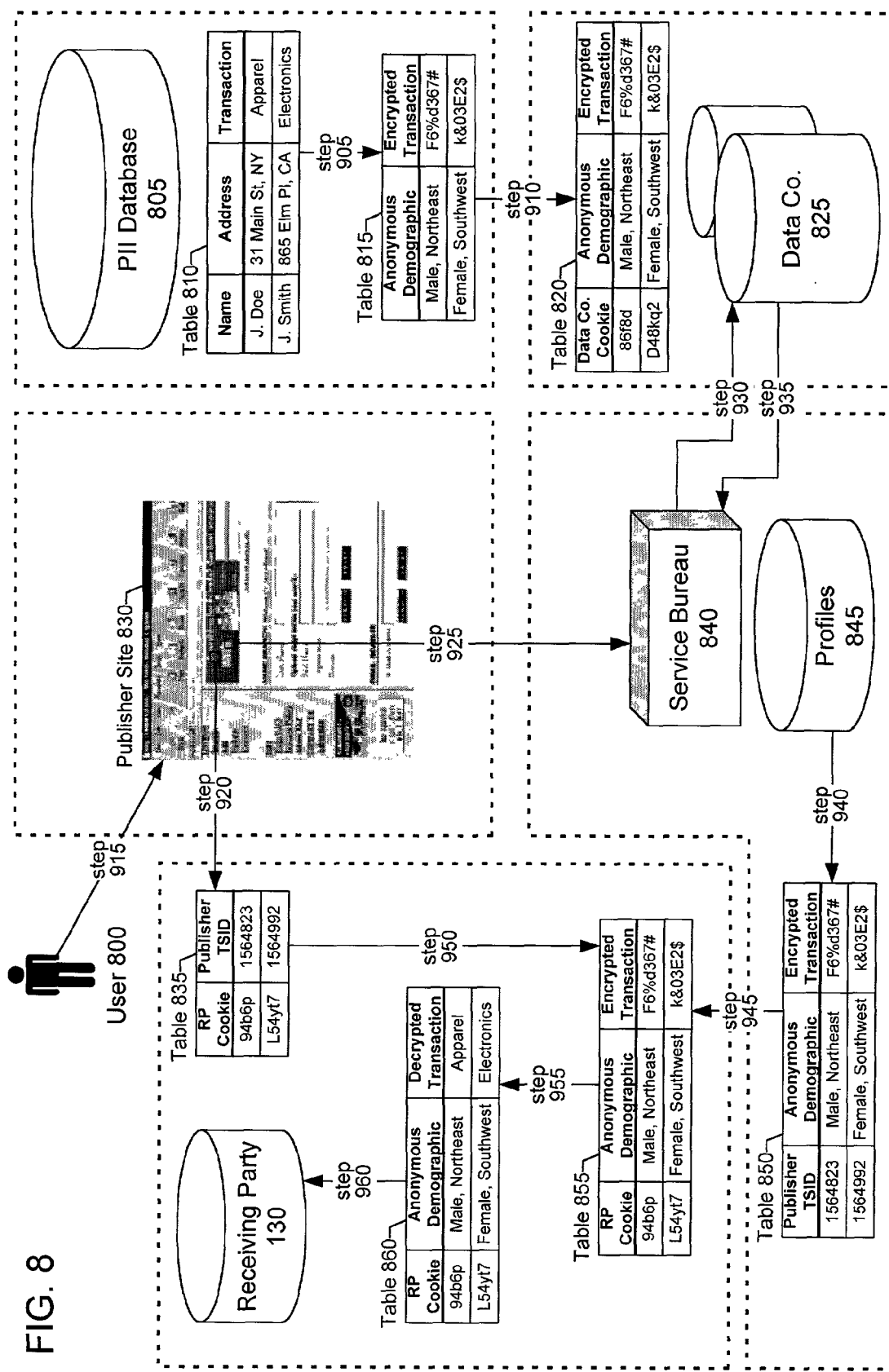
FIG. 8 is a block diagram that depicts anonymously sharing online user information though a publisher site in accordance with an embodiment of the present invention.
Figure 9:
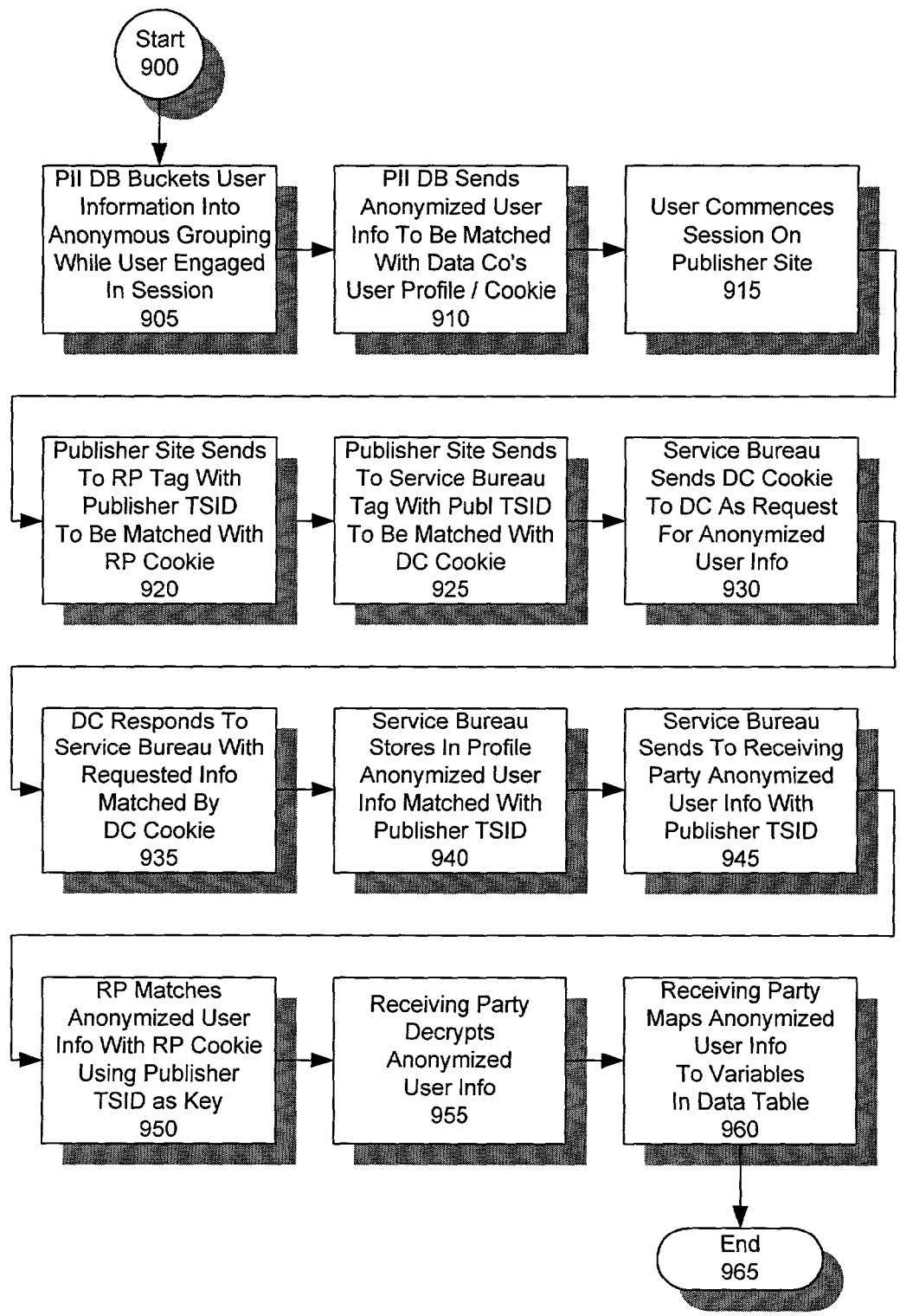
FIG. 9 is flow chart that illustrates a process for sharing online user information though a publisher site in accordance with an embodiment of the present invention.

FIG. 8 is a block diagram of the anonymous collection process for an exemplary alternative embodiment featuring user 800 browsing an online communications network (e.g., Internet) and visiting publisher site 830 that includes published information associated with receiving party 130. For this exemplary alternative embodiment, similar steps are followed as previously described for the merchant embodiment. Particularly, the matching mechanism used in the merchant embodiment by service bureau 640 (name and address information obtained offline from PII database 605) is replaced with a data company cookie created by data company 825 allowing the entire process to be performed online.

To enhance data security and privacy in the communications environment, one may employ secure connections for all point-to-point communications within the system. These may include connections between PII database 805 and data company 825, between data company 825 and service bureau 840 (which operates the anonymizer engine in this embodiment), and between service bureau 840 and receiving party 130. These secure connections may be implemented using a Secure Socket Layer (SSL) connection. The steps of this exemplary process (as shown in FIG. 8) are described below. All steps of the process may be performed while a user is engaged in an active session at an online site.

PII database 805 may include user information. Examples of PII databases would be those used by companies that maintain customer information alongside of purchase history. This user information may include personal user information (e.g., name, address, phone number, etc.) along with transactional, demographic, behavioral, and/or other information coupled to the user name and address. For the exemplary process described herein, transactional and demographic data are used as the exemplary data that may be coupled to a user's personal information, and a user's name and address is used as the exemplary personal user information contained in PII database 805. It is noted that the use of transactional and demographic data and a user's name and address is strictly exemplary (see table 810 in FIG. 8) and other forms of data and other personal information may be used in connection with the present inventive method and system.

Step 905 is performed by a provider of PII database 805, and may be performed independent of user 800's engagement in an active session with publisher site 830 (e.g., offline). At step 905, this user information is bucketed, or clustered, into an anonymous grouping to prevent triangulation, and the transactional data is encrypted to ensure that other parties are unable to access the data. For example, the user information may include demographic information identifying user 800 as an Australian with two children living in New York. During the bucketing process, this demographic information may be anonymized as a foreigner with more than one child living in the Northeast section of the United States. Furthermore, the transactional data may similarly be bucketed prior its encryption. Thus, for example, a transaction showing a purchase of a J. Crew men's sweater on Jul. 1, 2000 for $49 may be bucketed as a purchase of a men's apparel item during the 3$^{rd}$ Quarter, 2000 for an amount less than $100. As a result of this process, a party with access to the anonymized user information cannot determine, or triangulate, a unique individual from this data as any sensitive data has been removed, ensuring quality control for the system. An exemplary output from step 905 would be an output file including the following:

<Name><Address><Anon Demo><Encrypted Trans>

This exemplary code provides the name, address, anonymized demographic information, and encrypted transactional data string for user 800 (see table 815 in FIG. 8).

The parts of step 910 are performed by the provider of PII database 805 and data company 825, and may be performed independent of user 800's engagement in an active session with publisher site 830 (e.g., offline). At step 910, the provider of PII database 805 sends the user information including the name, address, anonymized demographic information, and encrypted transactional data to data company 825. One may use a secure connection for this communication between PII database 805 and data company 825. Data company 825 may already have stored the name, address, and demographic information for user 800 in its database. Upon receiving the name, address, anonymized demographic information, and encrypted transaction data, data company 825 matches the received name and address to the user name and address already stored and appends the encrypted transaction data, the anonymized demographic information, and a data company cookie that data company 825's Web server had previously placed on the Web browser of user 800 (see table 820 in FIG. 8). Additionally during this step, data company 825 could optionally validate the name and address information received from PII database 805.

As an example, data company 825 could be an online warrantee company. After user 800 had bought a DigitalCamera.com product, user 800 could have registered with fictitious Web site Warrantee.com (which, for the purposes of this specification, may represent an online warrantee company), giving Warantee.com PII on a web form. At this time Warrantee.com's Web server could also place a cookie on the browser and maintain the association in its database.

Step 915 may be performed by user 800 at publisher site 830. At step 915, user 800 may commence an active session by visiting (via a browser) online publisher site 830. Publisher site 830 discloses to user 800 its privacy policy including that user information may be anonymously delivered to a receiving party. Additionally, publisher site 830 may enable user 800 to opt-out from receiving any targeted information (e.g., banner advertising) as a result of user 800's disclosure. The opting-out may be performed, by example, by using a point-and-click application (e.g., link to receiving party website).

Step 920 is performed at publisher site 830. For this example, when user 800 visits publisher site 830, publisher site 830 may create an HTML tag and dynamically generate a TSID, associated with user 800, which is sent over to receiving party 130's server as a request for a 1×1 pixel. The request for the 1×1 pixel is an image request from publisher site 830. The image request allows receiving party 130 to deliver the image to publisher site 830 and collect information from publisher site 830, such as the TSID, and a receiving party cookie if found from user 800's browser. The TSID is used by receiving party 130 to create table 835 matching the TSID to a receiving party cookie (a data identifier).

Receiving party 130 takes the tag sent by publisher site 830, an exemplary tag including the following:

<img src="http://www.receivingparty.net/pixel; tempID=[TSID]?> and creates a table out of it which looks like this:

<Receiving Party Cookie><Publisher TSID>

An exemplary "Publisher TSID" may simply be a unique 6-digit source id for publisher site 830 appended to the unique TSID. The TSID may last as long as user 800 remains at publisher site 830, after which time it may expire. Alternatively, the TSID could optionally be set to expire automatically after a period of time (either predetermined or calculated from other factors).

Step 925 is performed at publisher site 830. For this example, publisher site 830 may create a tag and dynamically generate a TSID, associated with user 800, which is sent over to service bureau 840's server as a request for a 1×1 pixel. The request for the 1×1 pixel is an image request from publisher site 830. The image request allows service bureau 840 to deliver an image to publisher site 830 and collect information from publisher site 830, such as the TSID, and a data company cookie (which serves as identifier 100) if found from user 800's browser. This is accomplished by running a server in service bureau 840 within data company 825's domain so that it can read the data company cookies on the browser on each request.

The TSID is used by service bureau 840 to create a table matching the TSID to a data company cookie (a data identifier). Service bureau 840 takes the tag sent by publisher site 830, an exemplary tag including the following:

<img src="http://datacompany.servicebureau.net/pixel; tempID=[TSID]?>

The table created at service bureau 840 may include the following:

<Data Company Cookie><Publisher TSID>

An exemplary "Publisher TSID" may simply be a unique 6-digit source id for publisher site 830 appended to the unique TSID. The TSID may last as long as user 800 remains at publisher site 830, after which time it may expire. Moreover, the TSID could optionally be set to expire automatically after a period of time (either predetermined or calculated from other factors). In an alternative embodiment, the TSID could be generated at the browser level through a Web server call, utilizing javascript or any other client-side code.

At step 930, service bureau 840 feeds the data company cookie to data company 825. At this point publishing site 830 now continues with its interaction with user 800 for the rest of the session—after which point the RAM TSID is destroyed. Also, the TSID may be destroyed in response to other indicating factors including, but not limited to a timer.

At step 935, data company 825 matches the data company cookie with the associated anonymized demographic information, and encrypted transactional data. Data company 825 sends back the anonymized demographic information and encrypted transactional data corresponding to user 800 to service bureau 840. An exemplary feed from data company 825 may include the following:

<Data Company Cookie><Publisher TSID><Anon Demo><Encrypted Trans>

One may employ secure connections for communication between data company 825 and the service bureau 840, operator of the anonymizer engine.

In an alternative embodiment, steps 930 and 935 could utilize a different TSID ("TSID 2"), created at service bureau 840, for sending data between service bureau 840 and data company 825. In this embodiment, service bureau 840 sends TSID 2 along with the data company cookie to data company 825 in step 930, after which service bureau 840 deletes the data company cookie in near-real time. In step 935, data company 825 sends the anonymized demographic information and encrypted transactional data to service bureau 840 with TSID 2. Once received, service bureau 840 swaps TSID 2 for TSID. This results in limiting the entities which hold the TSID to the browser, service bureau 840 and receiving party 130, while also limiting the amount of time service bureau 840 holds the data company cookie.

At step 940, service bureau 840 receives the response from data company 825 and stores the TSID, anonymized demographic information, and encrypted transactional data in a transactional profile database 845. The profile would look like this (see table 850 in FIG. 8):

<Publisher TSID><Anon Demo><Encrypted Trans>
One may limit the time for which this data is retained, for example, by maintaining this data for a maximum of 36 hours. After which, the data company cookie may be deleted from profiles database 845.

At step 945, service bureau 840 sends out the TSID, anonymized demographic information and the encrypted transactional data to receiving party 130. The data sets outlined in step 940 may be sent to receiving party 130 via a SCP server (secure copy) and are never written to disk. Additionally, service bureau 840 deletes the transactional profile (table 850 in FIG. 8) containing the user information (TSID, anonymized demographic information, and encrypted transaction string).

At step 950, using earlier created table 835 matching the receiving party cookie with the TSID, receiving party 130 matches the anonymized demographic information and the encrypted transactional data of received table 850 with the receiving party cookie associated with user 800 in table 835 by using the publisher TSID as a key. The publisher TSID is then deleted from the system. The new, exemplary record created by this action may include the following (see table 855 in FIG. 8):

<Receiving Party cookie><Anon Demo><Encrypted Trans>
One may limit the time for which this data is retained, for example, by maintaining this data for a maximum of 36 hours.

At step 955, receiving party 130 may decrypt the transactional data to yield:

<Receiving Party cookie><Anon Demo><Decrypted Trans>
One may limit the time for which this data is retained, for example, by maintaining this data for a maximum of 36 hours.

At step 960, receiving party 130 transfers the received user data to a data storage area. The non-unique demographic and rolled-up transactional data may be mapped to variables in a data table, for example, a Behavioral Attribute Table (BAT). The anonymized demographic and transactional data is then added to the BAT.

Table 7 illustrates the type of data accessible by each entity during the associated steps described in the publisher embodiment:

TABLE 7

|  |  | PII | Trans | Demo | TSID | Data Co Cookie | RP Cookie |
|---|---|---|---|---|---|---|---|
| PII Database 805 | Steps 905, 910 | X | X | X |  |  |  |
| Data Company 825 | Steps 910, 935, 940 | X | [Encrypted] | X |  | X |  |
| Service Bureau 840 | Steps 925 |  |  |  | X | X |  |
|  | Steps 930, 935 |  | [Encrypted] | X | X | X |  |
| (Profiles 845) | Steps 940, 945 |  | [Encrypted] | X | X |  |  |
| Receiving Party 130 | Steps 920, 945 |  | [Encrypted] | X | X |  | X |
|  | Steps 955, 960 |  | X | X |  |  | X |

Table 8 illustrates the data flow through PIJ database 805 for each step described above:

TABLE 8

| Step |  | Name | PII Database Address | Transactions |
|---|---|---|---|---|
| 900 | START STATE | J. Doe | 31 Main St, NY | J. Crew Sweater, 7/2000, $50 |
| 905 | Bucketing/ De-triangulation | J. Doe | Northeast | Apparel, Q3 2000, <$100 |
| 905(a) | Encryption of Transaction Data | J. Doe | Northeast | F6%d367# |
| 910 | Table Sent To Data Co. |  |  |  |
| 910 | Data Co. Appends Encrypted String |  |  |  |
| 915 | User Visits Publisher Site |  |  |  |
| 920 | Publisher Site's Tags (Or Spotlight Embedded in Ad Tags) Send a TSID Creating a Table at Receiving Pty |  |  |  |
| 925 | Publisher Site's Tags (Or Spotlight Embedded in Ad Tags) Send a TSID Creating a Table at Service Bureau |  |  |  |
| 930 | Service Bureau Sends Data Co. Cookie To Data Co. |  |  |  |
| 935 | Data Co. Sends Demo and Transactional Data Back To Service Bureau |  |  |  |
| 940 | Data Co. Is Dropped from Service Bureau |  |  |  |
| 945 | Service Bureau Sends Remaining Table To Receiving Pty; Table Is Erased in the Service Bureau |  |  |  |
| 950 | Receiving Pty Exchanges DC Cookie For TSID |  |  |  |
| 960 | That Data Is Added To Receiving Pty's Data Repository |  |  |  |
| 965 | END STATE | J. Doe | 31 Main St, NY | J. Crew Sweater, 7/2000, $50 |

Table 9 illustrates the data flow through data company 825 for each step described above:

TABLE 9

| Step | | Data Co. Cookie | Name | Data Co. Address | Demo | Trans |
|---|---|---|---|---|---|---|
| 900 | START STATE | 86h2j | J. Doe | 31 Main St, NY | Male | |
| 905 | Bucketing/De-triangulation | | | | | |
| 905(a) | Encryption of Transaction Data | | | | | |
| 910 | Table Sent To Data Co. | | J. Doe | 31 Main St, NY | | F6%d367# |
| 910 | Data Co. Appends Encrypted String | 86h2j | J. Doe | 31 Main St, NY | Male | F6%d367# |
| 915 | User Visits Publisher Site | | | | | |
| 920 | Publisher Site's Tags (Or Spotlight Embedded in Ad Tags) Send a TSID Creating a Table at Receiving Pty | | | | | |
| 925 | Publisher Site's Tags (Or Spotlight Embedded in Ad Tags) Send a TSID Creating a Table at Service Bureau | | | | | |
| 930 | Service Bureau Sends Data Co. Cookie To Data Co. | 86h2j | | | Male | F6%d367# |
| 935 | Data Co. Sends Demo and Transactional Data Back To Service Bureau | | | | | |
| 940 | Data Co. Is Dropped from Service Bureau | | | | | |
| 945 | Service Bureau Sends Remaining Table To Receiving Pty; Table Is Erased in the Service Bureau | | | | | |
| 950 | Receiving Pty Exchanges DC Cookie For TSID | | | | | |
| 955 | Transactions are Decrypted; TSID Is Dropped | | | | | |
| 960 | That Data Is Added To Receiving Pty's Data Repository | | | | | |
| 965 | END STATE | | J. Doe | 31 Main St, NY | Male | F6%d367# |

Table 10 illustrates the data flow through service bureau 840 for each step described above:

TABLE 10

| Step | | Data Co. Cookie | TSID | Demo | Trans |
|---|---|---|---|---|---|
| 900 | START STATE | | | | |
| 905 | Bucketing/De-triangulation | | | | |
| 905(a) | Encryption of Transaction Data | | | | |
| 910 | Table Sent To Data Co. | | | | |
| 910 | Data Co. Appends Encrypted String | | | | |
| 915 | User Visits Publisher Site | | | | |
| 920 | Publisher Site's Tags (Or Spotlight Embedded in Ad Tags) Send a TSID Creating a Table at Receiving Pty | | | | |
| 925 | Publisher Site's Tags (Or Spotlight Embedded in Ad Tags) Send a TSID Creating a Table at Service Bureau | 86h2j | 1564823 | | |
| 930 | Service Bureau Sends Data Co. Cookie To Data Co. | | | | |
| 935 | Data Co. Sends Demo and Transactional Data Back To Service Bureau | 86h2j | 1564823 | Male | F6%d367# |
| 940 | Data Co. Is Dropped from Service Bureau | | 1564823 | Male | F6%d367# |
| 945 | Service Bureau Sends Remaining Table To Receiving Pty; Table Is Erased in the Service Bureau | | | | |
| 950 | Receiving Pty Exchanges DC Cookie For TSID | | | | |
| 955 | Transactions are Decrypted; TSID Is Dropped | | | | |
| 960 | That Data Is Added To Receiving Pty's Data Repository | | | | |
| 965 | END STATE | | | | |

Table 11 illustrates the data flow through receiving party 130 for each step described above:

TABLE 11

| Step | | Receiving Pty Cookie | TSID | Demo | Trans |
|---|---|---|---|---|---|
| 900 | START STATE | | | | |
| 905 | Bucketing/ De-triangulation | | | | |
| 905(a) | Encryption of Transaction Data | | | | |
| 910 | Table Sent To Data Co. | | | | |
| 910 | Data Co. Appends Encrypted String | | | | |
| 915 | User Visits Publisher Site | | | | |
| 920 | Publisher Site's Tags (Or Spotlight Embedded in Ad Tags) Send a TSID Creating a Table at Receiving Pty | 94b6p | 1564823 | | |
| 925 | Publisher Site's Tags (Or Spotlight Embedded in Ad Tags) Send a TSID Creating a Table at Service Bureau | | | | |
| 930 | Service Bureau Sends Data Co. Cookie To Data Co. | | | | |
| 935 | Data Co. Sends Demo and Transactional Data Back To Service Bureau | | | | |
| 940 | Data Co. Is Dropped from Service Bureau | | | | |
| 945 | Service Bureau Sends Remaining Table To Receiving Pty; Table Is Erased in the Service Bureau | | 1564823 | Male | F6%d367# |
| 950 | Receiving Pty Exchanges DC Cookie For TSID | 94b6p | 1564823 | Male | F6%d367# |
| 955 | Transactions are Decrypted; TSID Is Dropped | 94b6p | | Male | Apparel, Q3 2000, <$100 |
| 960 | That Data Is Added To Receiving Pty's Data Repository | 94b6p | | Male | Apparel, Q3 2000, <$100 |
| 965 | END STATE | 94b6p | | Male | Apparel, Q3 2000, <$100 |

Figure 10:
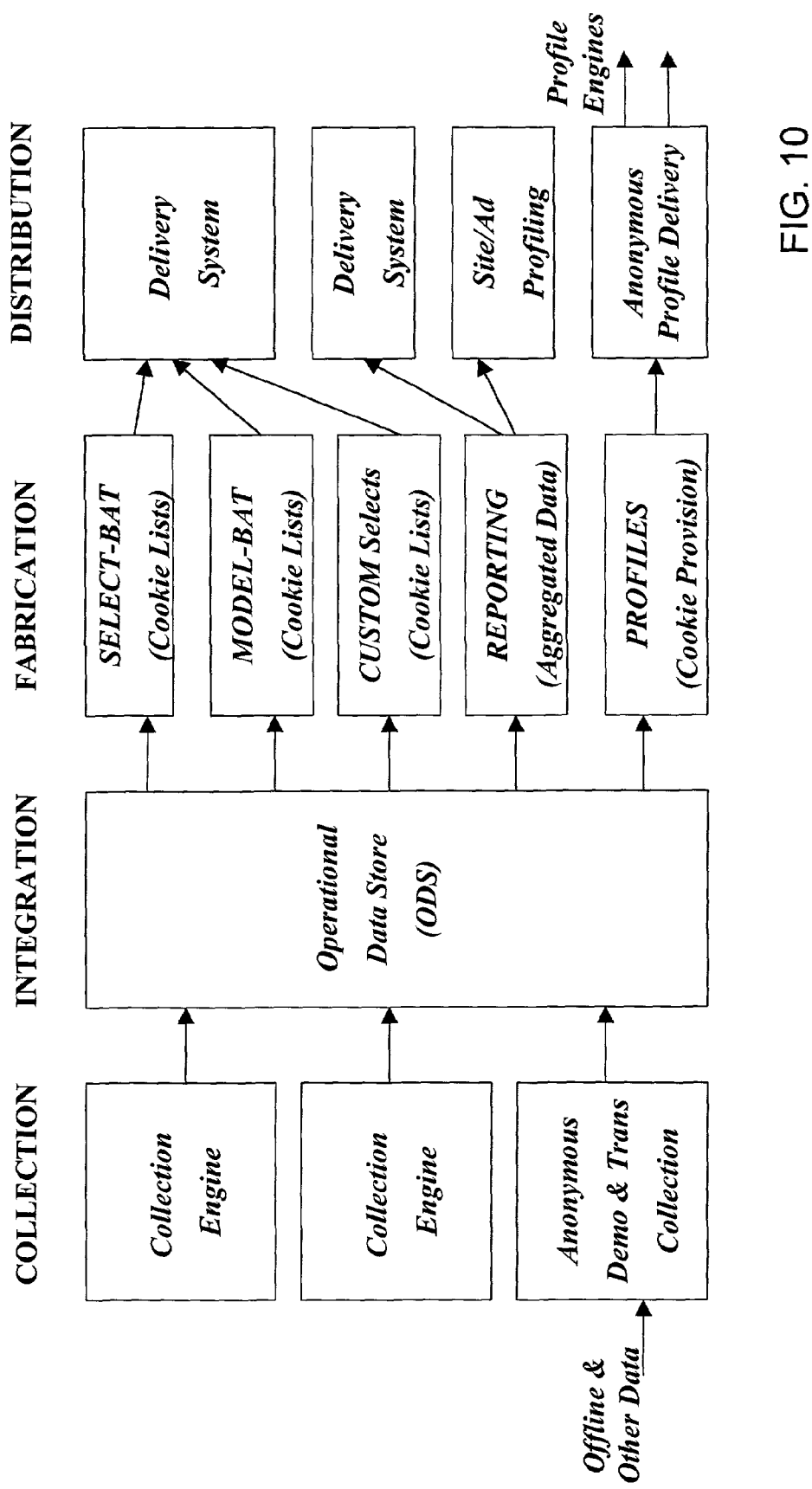
FIG. 10 is a block diagram that depicts a data collection system in accordance with an embodiment of the present invention.

Referring to FIG. 10, the previous embodiments described herein may be combined with other data collection engines to create a more robust data collection system that also provides data delivery services. This system may include a plurality of exemplary stages including, but not limited to, collection, integration, fabrication, and distribution stages.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A computer-implemented method for sharing anonymized user information, comprising:
  generating, with a computer system, anonymized user information by:
    (a) accessing personally identifiable information about a user,
    (b) using the personally identifiable information about the user to identify generalized, non-personally identifiable demographic information that defines a set of generalized information that includes demographic information consistent with the personally identifiable information about the user, and
    (c) assigning the generalized, non-personally identifiable demographic information as anonymized user information corresponding to the user;
  associating, via the computer system, an identifier with the anonymized user information; and
  sending, via the computer system, the anonymized user information to a receiving party.

2. The method of claim 1, wherein the identifier includes at least one of a user identifier and a Web browser identifier.

3. The method of claim 1, wherein the identifier includes personally identifiable information, including at least one of a name, an address, a telephone number, a social security number, and an email address.

4. The method of claim 1, wherein the identifier includes a cookie.

5. The method of claim 1, further including:
  receiving a temporary id;
  using the personally identifiable information as a key to obtain the anonymized user information from a data source;
  sending the temporary id with the anonymized user information to the receiving party.

6. The method of claim 5, wherein the receiving party uses the temporary id as a key to obtain the anonymized user information.

7. The method of claim 5, wherein the temporary id and the personally identifiable information about the user is deleted at a predetermined period of time after sending the temporary id with the anonymized user information to the receiving party.

8. The method of claim 1, wherein the identifier includes a cookie, and further including:
  receiving a temporary id and the cookie associated a Web browser of the user;
  using a cookie as a key to obtain the anonymized user information from a data source;
  sending the temporary id with the anonymized user information to the receiving party.

9. The method of claim 8, wherein the receiving party uses the temporary id as a key to obtain the anonymized user information.

10. The method of claim 8, wherein the temporary id and the cookie associated with the Web browser is deleted at a predetermined period of time after sending the temporary id with the anonymized user information to the receiving party.

11. The method of claim 1, further comprising determining whether the user has indicated an election to opt-out of sharing the anonymized user information, and wherein both associating via the computer system the identifier with the anonymized user information of the user and sending via the computer system the anonymized user information to the receiving party are performed only when a determination is made that the user has not indicated an election to opt-out of the sharing the anonymized user information.

12. The method of claim 1, further comprising determining that the user has opted-in to sharing the anonymized user information before at least one of associating via the computer system an identifier with the anonymized user information and sending via the computer system the anonymized user information to a receiving party.

13. An apparatus for sharing anonymized user information, comprising:
a processor; and
a memory storing instructions adapted to be executed by the processor to:
generate anonymized user information by:
(a) accessing personally identifiable information about a user,
(b) using the personally identifiable information about the user to identify generalized, non-personally identifiable demographic information that defines a set of generalized information that includes demographic information consistent with the personally identifiable information about the user, and
(c) assigning the generalized, non-personally identifiable demographic information as anonymized user information corresponding to the user; and
associate an identifier with the anonymized user information and send the anonymized user information to a receiving party, the memory coupled to the processor.

14. The apparatus of claim 13, wherein the identifier includes at least one of a user identifier and a Web browser identifier.

15. The apparatus of claim 13, wherein the identifier includes personally identifiable information, including at least one of a name, an address, a telephone number, a social security number, and an email address.

16. The apparatus of claim 13, wherein the identifier includes a cookie.

17. The apparatus of claim 13, wherein the instructions are further adapted to be executed to receive a temporary id, to use the personally identifiable information as a key to obtain the anonymized user information from a data source, and to send the temporary id with the anonymized user information to the receiving party.

18. The apparatus of claim 17, wherein the receiving party uses the temporary id as a key to obtain the anonymized user information.

19. The apparatus of claim 17, wherein the temporary id and the personally identifiable information about the user is deleted at a predetermined period of time after sending the temporary id with the anonymized user information to the receiving party.

20. The apparatus of claim 13, wherein the identifier includes a cookie, and wherein the instructions are further adapted to be executed to receive a temporary id and the cookie associated with a Web browser of the user, to use the cookie as a key to obtain the anonymized user information from a data source, and to send the temporary id with the anonymized user information to the receiving party.

21. The apparatus of claim 20, wherein the receiving party uses the temporary id as a key to obtain the anonymized user information.

22. The apparatus of claim 20, wherein the temporary id and the cookie associated with the Web browser is deleted at a predetermined period of time after sending the temporary id with the anonymized user information to the receiving party.

23. A system for sharing anonymized user information, comprising:
means for generating anonymized user information by:
(a) accessing personally identifiable information about a user,
(b) using the personally identifiable information about the user to identify generalized, non-personally identifiable demographic information that defines a set of generalized information that includes demographic information consistent with the personally identifiable information about the user, and
(c) assigning the generalized, non-personally identifiable demographic information as anonymized user information corresponding to the user;
means for associating an identifier with the anonymized user information; and
means for sending the anonymized user information to a receiving party.

* * * * *